Patented Apr. 13, 1954

2,675,336

UNITED STATES PATENT OFFICE 2,675,336

PHENOLIC RESIN

John T. Stephan, Seattle, Wash., assignor to Monsanto Chemical Company, St. Louis, Mo., a corporation of Delaware No Drawing. Application March 20, 1952,
Serial No. 277,717

14 Claims. (Cl. 154—45.9)

This invention relates to an improved water soluble phenolic resin especially adapted for use as a glue in making hot press plywood.

It is well known to use phenol formaldehyde water soluble resins as glues for hot press plywood. In making such resins it has been customary to use as the phenolic component substantially pure phenol and while the use of other phenolic bodies has been suggested in replacement for all or part of the phenol, it has previously been considered necessary to use only certain phenols boiling below 120° C.

It is an object of this invention to provide an improved water soluble phenolic resin. It is a further object of this invention to provide an improved phenolic adhesive wherein the phenolic component is made up only in part of low boiling phenols. Another object is to provide improved plywood products.

According to the present invention new and improved phenolic resins are provided by reacting a mixture of "a low boiling" phenol (as hereinafter defined) and an alkaline redwood bark extract powder with formaldehyde in the presence of an alkali metal hydroxide. Surprisingly, it has been discovered that such resins possess unique and valuable properties and are particularly adapted for use as plywood adhesives.

The following examples are illustrative of the invention and are not to be construed as limitative thereof. Where parts are mentioned, they are parts by weight.

The viscosity values given in Examples I and II are obtained by means of a McMichael viscosimeter at 70° F. with a No. 26 wire and a 3 cm. immersion of a bobbin having a diameter of 1 cm. and with a cup revolution speed of 24 R. P. M.

Example I

A reaction vessel equipped with an agitator, a cooling jacket and water cooled return condenser is charged with the following ingredients in the order given:

| | Parts |
|---|---|
| Phenol | 1552 |
| Alkaline redwood bark extract powder | 274 |
| Commercial formalin containing 37% formaldehyde by weight | 3180 |
| Water | 2038 |
| Sodium hydroxide solution in water (containing 50% NaOH by weight) | 268 |

While agitating the above charge, the mixture is heated gradually to its boiling point and allowed to boil while refluxing at about 214° F. for about 25 minutes. The reaction mixture is then cooled to about 180° F. and held at this temperature for approximately 23 minutes and at this point is found to have a viscosity of about 175.

Thereafter 445 grams of an aqueous solution of sodium hydroxide having a 50% NaOH content are added to the reaction mixture whereby the viscosity thereof is reduced to about 0.5. The resinous reaction product is then heated at 170° F. until the viscosity is about 25. This requires about 2 hours. Thereafter 623 grams of an aqueous solution of sodium hydroxide having a 50% NaOH content are added and the heating continued at 170° F. until the viscosity is about 2.0. This requires about 10 minutes.

The reaction product prepared as described above is then rapidly cooled to about 70° F. and mixed with a filler material consisting essentially of pulverized oat hulls marketed by the Quaker Oats Company under the trade-mark "Furafil" and water in the ratio of 500 parts of the reaction product, 100 parts of filler and 100 parts of water. The resulting glue has a viscosity of about 4.

It is found that Douglas fir veneers bonded with the above glue result in a plywood product exhibiting excellent adhesion. For example, a five-ply plywood product having a thickness of 1⅜ inch may be hot pressed in about 7 minutes at 285° F. and a pressure of 175 pounds per square inch to yield a product which on shear tests possesses approximately 100% wood failure after being subjected to the well known four hour alternate boil test.

Example II

A reaction vessel similar to that used in Example I is charged with the following ingredients in the order set forth below:

| | Parts |
|---|---|
| Phenol | 1370 |
| Alkaline redwood bark extract powder | 457 |
| Methanol free formalin containing 37% formaldehyde by weight | 3180 |
| Water | 2038 |
| Aqueous caustic soda solution (containing 50% NaOH by weight) | 268 |

The reaction mixture is agitated and the temperature gradually raised to reflux and boiled under reflux conditions at about 213° F. for about 22 minutes. The mixture is then cooled to about 180° F. and held at this temperature until the viscosity is about 103. This requires about 17 minutes. Thereafter 445 grams of an aqueous caustic soda solution containing 50% NaOH by weight is then heated at 170° F. until the viscosity reaches about 20. At this point 623 grams of an aqueous caustic soda solution containing 50% NaOH by weight are added and the mixture heated at 170° F. until a viscosity of 2-3 is obtained.

The reaction mixture prepared as described above is rapidly cooled to 70° F. and mixed with a filler material consisting essentially of pulverized oat hulls marketed by the Quaker Oats Company under the trade-mark "Furafil" and water in the ratio of 500 parts of the reaction mixture, 90 parts of filler and 110 parts of water. It is found that plywood products using this glue possess the same short pressing times as the product of Example I. Similarly a plywood product prepared in the same manner as the product in Example I exhibits excellent wood failure results when subjected to shear tests after the four hour alternate boil test.

*Example III*

| | Parts |
|---|---|
| Phenol | 80 |
| Alkaline redwood bark extract powder | 14 |
| Commercial formalin (37% formaldehyde by weight) | 243 |
| Aqueous caustic soda solution (containing 20 parts NaOH) | 40 |

The above ingredients are mixed in the order given in a reaction vessel similar to the one used in Examples I and II. The mixture is agitated and boiled under reflux conditions for about 35 minutes. The reaction product is then rapidly cooled to room temperature. A plywood glue is formulated by mixing the above described glue with 300 mesh red fir wood flour in the ratio of 100 parts of the above described resinous reaction product and 7 parts of wood flour. Plywood panels are prepared in the same manner as in Examples I and II except that a somewhat longer pressing time is used, i. e., about 10 minutes. The resulting plywood product is found to give excellent wood failure results on being subjected to shear tests after the four hour alternate boil test.

*Example IV*

Example I is repeated except that the phenolic material is made up of 1095 parts of phenol and 730 parts of alkaline redwood bark extract powder. The reaction conditions are maintained substantially the same as in Example I and the final resinous reaction product has substantially the same viscosity as in the case of Example I.

A plywood glue is formulated from this resinous material using 75 parts by weight of a filler material consisting essentially of pulverized oat hulls marketed by the Quaker Oats Company under the trade-mark "Furafil" and 125 parts by weight of water for each 500 parts by weight of resinous reaction product. This glue has excellent spreading characteristics on Douglas fir veneers and is found to require substantially the same pressing time in pressing a five ply panel similar to the one described in Example I. The plywood product exhibits excellent wood failure after being subjected to the same boil test.

*Example V*

Example III is repeated except that the phenolic material is made up of 56 parts by weight of phenol and 38 parts by weight of alkaline redwood bark extract powder. The resinous product is prepared under substantially the same conditions as those used in Example III and results in a product which may be formulated into a glue by the addition of 20 parts of a filler material consisting essentially of pulverized oat hulls marketed by the Quaker Oats Company under the trade mark "Furafil" and 20 parts of water for each 100 parts of the resinous reaction product. The resulting glue is found to spread rapidly on plywood panels and plywood products having excellent bonding characteristics are prepared therefrom under conventional pressing conditions.

*Example VI*

| | Parts |
|---|---|
| Phenol | 71 |
| Alkaline redwood bark extract powder | 23 |
| Formalin (37% formaldehyde) | 243 |
| Sodium hydroxide | 30 |
| Water | 30 |

The above ingredients are charged to the same type of reaction vessel as used in previous examples in the order given above, the sodium hydroxide having previously been dissolved in the water. The mixture is boiled under reflux conditions for about 45 minutes and thereafter rapidly cooled to room temperature. The resulting product is characterized by substantial absence of the odor of formaldehyde. On mixing with small amounts of wood flour or other fillers an excellent glue is obtained. On molding plywood panels using this glue it is found that a particularly short pressing time may be used while still yielding a product of high quality and excellent bond strength.

The storage life of the liquid glue of this example is found to be particularly long and this glue is also characterized by being especially adapted for spray drying to a dry powdered glue base which may be reconstituted into a glue by the addition of water.

Substitution of an equivalent amount of paracresol for the phenol in the above example and extending the boiling period to 60 minutes results in a resin which may be formulated into an excellent plywood adhesive.

*Example VII*

This example illustrates the use of metacresol in place of phenol.

| | Parts |
|---|---|
| Metacresol | 66 |
| Alkaline redwood bark extract powder | 28 |
| Formalin (37% formaldehyde) | 203 |
| Sodium hydroxide | 16 |
| Water | 16 |

The resinous reaction product is prepared from the above ingredients in a manner similar to that of Example III except that the reflux boiling continues 17 minutes. The resulting resin is found to lend itself to formulation of glues having good adhesive properties. Thus plywood products having good resin bond strengths are prepared from glues formulated with the resin of this example.

An outstanding feature of the resins of the invention as illustrated by Examples I–VII inclusive, is their uniform flow characteristics, i. e., it is found that substantially uniform penetration into the wood is obtained during plywood pressing operations. Also the adhesives have unusual compatibility characteristics when applied to wood which result in exceptionally high quality plywood products.

The adhesive resin syrups of the invention are highly stable on storage. The spray dried products are particularly advantageous in this respect.

Among the other valuable characteristics of the adhesive products of the invention is their ease of spreading and consequent improved assembly time tolerance.

As indicated by the examples numerous variations may be introduced into the process of preparing the resin adhesives of the invention. Thus the alkali soluble redwood bark extract powder content may comprise from 10 to 50% and preferably 15–30%, of the phenolic content of the charge, i. e., the sum of the low boiling phenol and the alkaline redwood bark extract powder. The amount of formaldehyde used may be varied between 30 and 110 parts (dry basis) and preferably 40–100 parts for every 100 parts of the phenolic content of the charge. The amount of alkali used in making the resins of the invention may be varied substantially, for example, between 8 and 50 parts on a NaOH equivalent basis and preferably 15–40 parts for every 100 parts of phenolic material, the precise amount depending upon the composition of the remainder of the charge and the particular type of resinous product which is desired.

The caustic soda may be replaced by an equivalent amount of sodium carbonate or the corresponding compounds of other alkali metals may be used such as potassium hydroxide and potassium carbonate.

In making up plywood adhesives it is customary to incorporate a certain amount of filler such as wood flour, walnut shell flour or other fillers such as the filler material consisting essentially of pulverized oat hulls marketed by the Quaker Oats Company under the trade-mark "Furafil" used in Examples I and II. Usually the amount of filler is between 5% and 50% by weight of the resin solids.

In preparing resinous products according to the process exemplified by Examples I and II wherein the alkali is added in stages it is preferred that the amount of alkali metal hydroxide in the initial reaction mixture fall within the range of about 6 to 20 parts by weight on a NaOH equivalent basis for every 100 parts by weight of phenolic material and that at least 6 parts by weight be added subsequent to the initial reaction in one or more subsequent stages.

When the alkaline soluble redwood bark extract content of the phenolic component drops below 10% by weight, it is found that the advantageous characteristics of the resins of the invention as plywood adhesives fall off rapidly. Similarly the use of more than 50% alkali soluble redwood bark extract by weight in the phenolic component results in resins of substantially reduced reactivity, i. e., the press time in making plywood panels increases substantially. Also the viscosity of an aqueous solution thereof becomes substantially greater.

The alkaline soluble redwood bark extract powder is obtained according to the method set forth in an article by Frank A. Cottwitz and Loren V. Forman in Industrial and Engineering Chemistry for December, 1948, on pages 2443–2450. The sodium salt of this product is described in this article as Sodium Palconate and is sold under this designation by the Pacific Lumber Company. The preparation of this redwood bark product is also described in United States Patent No. 2,549,142. The redwood bark product may be incorporated in the charge either in the form of its sodium or other alkali metal salt or if desired in the "acid" form and converted into the alkali metal salt thereof in situ by the addition of sufficient excess alkali.

The amount of water incorporated in the charge may be substantially varied depending upon the end use for the resinous product but for the purpose of providing a plywood adhesive it is desirable that the total water content fall within the approximate range of 40 to 70% by weight of the total charge. Such aqueous solutions in general will have viscosities in the range between 20 and 3000 centipoises.

The phenols referred to herein in the specification and claims as "a low boiling phenol" are phenols having a boiling point or distillation range between 180° and 220° C. and not containing more than about 15% of either orthocresol or xylenol or both. Thus while phenol itself may be substituted in whole or in part by metacresol, paracresol and mixtures thereof, the orthocresol and higher phenol content, for example, xylenol should be kept within the limit set forth above. The preferred products of the invention are made from substantially pure phenol ($C_6H_5OH$).

The products prepared according to the invention may be suitably dried if desired in a spray dryer and thereafter converted or reconstituted to a suitable adhesive by the use of water. In the case of multiple addition of alkali during the preparation of the resin, the spray drying may be carried out after the initial reaction or one of the subsequent additions of alkali. In case the spray drying is carried out prior to the final alkali reaction the water soluble powder may be mixed with water with added alkali in place of the final alkali addition described in the examples. If the spray drying is carried out on the final adhesive resin, the resulting water soluble powder may be reconstituted to an equivalent glue by mixing with water alone.

For the purpose of providing readily spreadable adhesives for plywood, the viscosity of the aqueous resin of the invention is preferably between 1 and 15, measured as described above in connection with Examples I and II. A more preferred range of viscosity for use in preparing Douglas fir plywood is one between 1 and 5. Also it is found that the adhesives preferably have a resin solid-water ratio between about 1.5 and 1. The use of multiple alkali addition processes is beneficial in providing adhesives with relatively low viscosity characteristics while at the same time retaining a high resin solids content. Of course it is to be understood that other uses for the resins of the invention, for example impregnating, coating, molding and laminating uses other than in connection with plywood may require resinous materials of other viscosity and resin content values.

In the preparation of plywood panels, the nature of the panels and the conditions of pressing may be substantially those in commercial use. Thus Douglas fir veneer having about a 3% moisture content may be spread with the adhesives of the invention at the rate of about 40 to 80 pounds of wet glue per thousand feet of glue line. After standing for about 15 minutes the panels may be assembled and hot pressed under the usual conditions such as those described above. After pressing it is found that the plywood delivered from the press has a moisture content ranging between 3 and 10% which eliminates the requirement for remoistening. Normally the panels are closely piled immediately after pressing and allowed to stand until cool.

In the preparation of plywood products using the resin glues of the invention time and temperature are interchangeable to a large extent.

Thus the press temperature may be lowered when longer press times are suitable or desirable and conversely higher press temperatures may be employed when shorter press times are required. The usual range of press temperatures is between 220° and 300° F. The press time in addition to depending upon the temperature employed will vary with the thickness of the assembly. The mechanical pressure required is dependent upon the shapes and conditions of the wood.

The boil test referred to in the examples is the Douglas Fir Plywood Association's "Alternate Boil Test for Exterior Plywood" (Bureau of Standards Bulletin C. S. 45-40). The specimens are boiled for 4 hours, dried for 16 hours at 145° F., boiled for an additional 4 hours, and then shear tested while wet.

The resinous products of the invention may be used in various ways and as pointed out before are especially adapted for use as plywood adhesives for either exterior or interior plywood. They may also be employed for the purpose of impregnating paper, cloth and the like and as a molding material or as a binder in molded products and for wood waste board made either by the wet or dry processes.

What is claimed is:

1. A water soluble phenolic resin comprising the reaction product of phenolic material containing a phenol having a distillation range between 180 and 220° C. and not containing more than about 15% of at least one phenol selected from the group consisting of ortho cresol, xylenol and mixtures thereof and an alkaline redwood bark extract powder, and aqueous formaldehyde in the presence of an alkali metal hydroxide.

2. A water soluble phenolic resin comprising the reaction product of 100 parts by weight of phenolic material made up of 50 to 90% by weight of a phenol having a distillation range between 180 and 220° C. and not containing more than about 15% of at least one phenol selected from the group consisting of ortho cresol, xylenol and mixtures thereof and the balance alkaline redwood bark extract powder, aqueous formaldehyde containing 30 to 110 parts by weight of formaldehyde (dry basis) and 8 to 50 parts of alkali metal hydroxide on a NaOH equivalent basis.

3. A water soluble phenolic resin comprising the reaction product of 100 parts by weight of phenolic material made up of 50 to 90% by weight phenol and the balance alkaline redwood bark extract powder, aqueous formaldehyde containing 30 to 110 parts of formaldehyde (dry basis) and 8 to 50 parts of sodium hydroxide.

4. A water soluble phenolic resin comprising the reaction product of 100 parts by weight of phenolic material made up of 70 to 85% phenol by weight and the balance alkaline redwood bark extract powder, aqueous formaldehyde containing 40 to 100 parts of formaldehyde (dry basis) and 15 to 40 parts of sodium hydroxide.

5. A water soluble aqueous phenolic resin adhesive comprising an aqueous solution of the product as defined in claim 3 having a water content between 40% and 70% and a viscosity between 20 and 3000 centipoises.

6. Hot pressed plywood glued with a phenolic resin bond as defined in claim 5.

7. A water soluble aqueous phenolic resin adhesive comprising an aqueous solution of the product as defined in claim 4 and having a water content of 40% to 70% and a viscosity of 20 to 3000 centipoises.

8. Hot pressed plywood glued with a phenolic resin bond as defined in claim 7.

9. A water soluble dry powder phenolic resin glue base as defined in claim 3.

10. A water soluble dry powdered phenolic resin glue base as defined in claim 4.

11. Hot pressed plywood glued with a phenolic resin bond as defined in claim 1.

12. A water soluble phenolic resin adhesive as defined in claim 2 in which 6 to 20 parts of alkali metal hydroxide on a NaOH equivalent basis is present in the initial stage of the reaction and at least an additional 6 parts of alkali metal hydroxide on a NaOH equivalent basis is added subsequent to the initial stage of the reaction.

13. A water soluble phenolic resin adhesive as defined in claim 3 in which 6 to 20 parts of sodium hydroxide is present during the initial stage of the reaction and at least an additional 6 parts of sodium hydroxide is added subsequent to the initial reaction.

14. A water soluble phenolic resin adhesive as defined in claim 4 in which 6 to 20 parts of sodium hydroxide are present during the initial stage of the reaction and at least an additional 6 parts of sodium hydroxide are added subsequent to the initial reaction.

References Cited in the file of this patent

UNITED STATES PATENTS

| Number | Name | Date |
|---|---|---|
| Re. 23,347 | Redfern | Mar. 20, 1951 |
| 2,549,142 | Thompson | Apr. 17, 1951 |
| 2,574,784 | Heritage | Nov. 13, 1951 |
| 2,574,785 | Heritage | Nov. 13, 1951 |

OTHER REFERENCES

Cottwitz: Industrial and Engineering Chemistry, vol. 41, pages 2443-2450, December 1948.